US012669484B2

(12) United States Patent
Guckenberger et al.

(10) Patent No.: US 12,669,484 B2
(45) Date of Patent: Jun. 30, 2026

(54) LOCK MASS CORRECTION DURING CHROMATOGRAPHY VOID TIME

(71) Applicant: Thermo Finnigan LLC, San Jose, CA (US)

(72) Inventors: George B. Guckenberger, Austin, TX (US); Deven Lee Shinholt, Leander, TX (US); Xin Zheng, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 338 days.

(21) Appl. No.: 18/487,496

(22) Filed: Oct. 16, 2023

(65) Prior Publication Data

US 2024/0192183 A1     Jun. 13, 2024

Related U.S. Application Data

(60) Provisional application No. 63/387,079, filed on Dec. 12, 2022.

(51) Int. Cl.
*G01N 30/86* (2006.01)
*G01N 30/02* (2006.01)
*G01N 30/72* (2006.01)

(52) U.S. Cl.
CPC ..... *G01N 30/8665* (2013.01); *G01N 30/7206* (2013.01); *G01N 2030/025* (2013.01); *G01N 30/72* (2013.01); *G01N 30/8624* (2013.01)

(58) Field of Classification Search
CPC ........... G01N 30/8665; G01N 30/7206; G01N 2030/025; G01N 30/8624; G01N 30/72
USPC ........................................................ 73/1.06
See application file for complete search history.

(56) References Cited

U.S. PATENT DOCUMENTS 5,703,360 A    12/1997   Fischer et al.
5,939,612 A    8/1999    Wylie et al.
6,868,343 B1 *  3/2005   Bayerl ................. G01N 33/552
                                                        702/19

(Continued)

OTHER PUBLICATIONS

Li et al, "Mass Accuracy Check Using Common Background Peaks for Improving Megabolome Data Quality in Chemical Isotope Labeling LC-MS," Journal of the American Society for Mass Spectrometry, 2019, vol. 30, pp. 1733-1741.

(Continued)

*Primary Examiner* — Peter J Macchiarolo
*Assistant Examiner* — John M Royston

(57) ABSTRACT

Disclosed herein are scientific instrument support systems, related methods, computing devices, and computer-readable media. For example, in some embodiments, a scientific instrument support apparatus includes sample analysis logic to cause a sample to be injected into a gas chromatograph and to obtain a mass spectrum of the sample using a mass spectrometer coupled to the output of the gas chromatograph, the mass spectrometer utilizing a mass calibration or a lock mass correction while obtaining the mass spectrum of the sample; calibration gas logic to control a supply of a calibration gas to the mass spectrometer during the void time of the gas chromatograph; and lock mass calibration logic to obtain a mass spectrum of the calibration gas using the mass spectrometer during the void time of the gas chromatograph and to calculate the mass calibration or the lock mass correction to be used by the sample analysis logic.

19 Claims, 5 Drawing Sheets

(56) References Cited

U.S. PATENT DOCUMENTS

| 11,031,217 | B2 | 6/2021 | Green | |
|---|---|---|---|---|
| 2007/0200060 | A1 | 8/2007 | Russ, IV et al. | |
| 2013/0075598 | A1* | 3/2013 | Ledford, Jr. | H01J 49/0009 |
| | | | | 250/252.1 |
| 2014/0117219 | A1* | 5/2014 | Kenny | H01J 49/40 |
| | | | | 250/252.1 |
| 2022/0074901 | A1* | 3/2022 | Sumigama | G01N 30/7233 |
| 2022/0236240 | A1* | 7/2022 | Jünemann | G01N 30/16 |
| 2022/0270867 | A1 | 8/2022 | Quarmby et al. | |
| 2023/0008042 | A1* | 1/2023 | Zeng | G01J 3/28 |

OTHER PUBLICATIONS

Charles, Laurence, "Flow injection of the lock mass standard for accurate mass measurement in electrospray ionization time-of-flight mass spectrometry coupled with liquid chromatography," Rapid Communication Mass Spectrometry, 2003, vol. 17, No. 13, pp. 1383-1388.
Brochu et al. "Mass Spectra alignment using virtual lock-masses," Scientific Reports, Mar. 30, 2018, vol. 9, No. 8469.

* cited by examiner

400

700

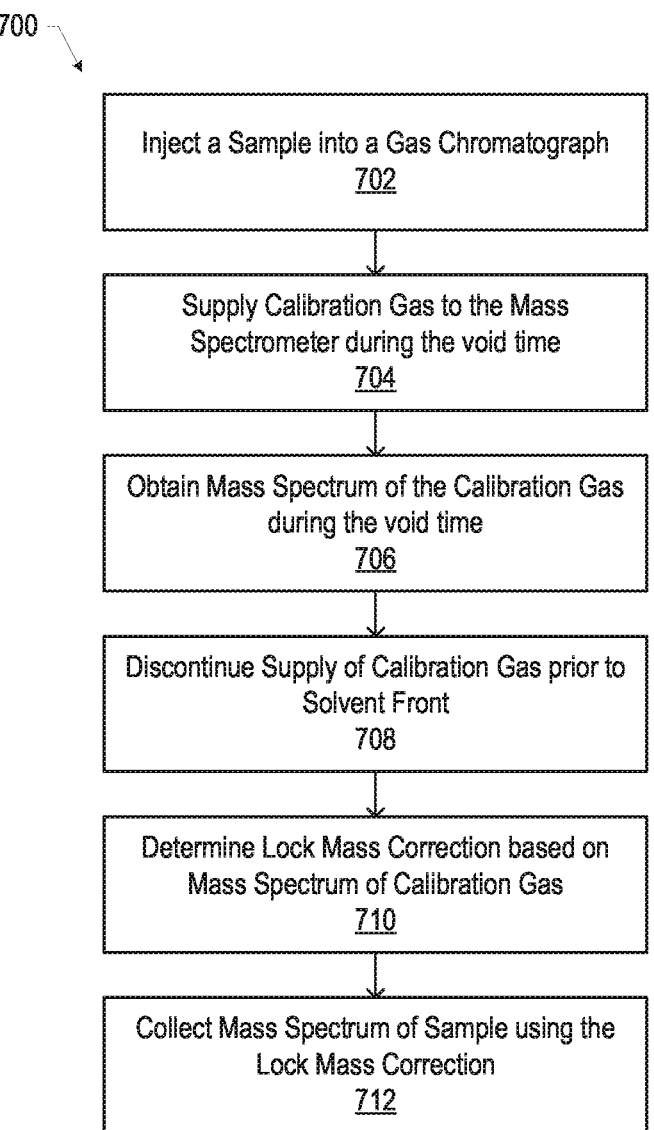

Inject a Sample into a Gas Chromatograph
702

Supply Calibration Gas to the Mass
Spectrometer during the void time
704

Obtain Mass Spectrum of the Calibration Gas
during the void time
706

Discontinue Supply of Calibration Gas prior to
Solvent Front
708

Determine Lock Mass Correction based on
Mass Spectrum of Calibration Gas
710

Collect Mass Spectrum of Sample using the
Lock Mass Correction
712

FIG. 7

LOCK MASS CORRECTION DURING CHROMATOGRAPHY VOID TIME

CROSS-REFERENCE TO RELATED APPLICATION

This application claims the priority benefit under 35 U.S.C. § 119(e) to U.S. Provisional Patent Application No. 63/387,079, filed on Jun. 15, 2022, the disclosure of which is incorporated herein by reference in its entirety.

BACKGROUND

Scientific instruments may include a complex arrangement of movable components, sensors, input and output ports, energy sources, and consumable components. Failures or changes in any part of this arrangement may result in a "downed" instrument, one that is not able to perform its intended function.

In particular, scientific instruments such as mass spectrometers may require calibration of various components, such as a mass analyzer. The calibration may drift over time due to various factors. As such, there is a need for improved calibration methods.

SUMMARY

In a first aspect, a scientific instrument support apparatus can include sample analysis logic to cause a sample to be injected into a gas chromatograph and to obtain a mass spectrum of the sample using a mass spectrometer coupled to the output of the gas chromatograph, the mass spectrometer utilizing a mass calibration or a lock mass correction while obtaining the mass spectrum of the sample; calibration gas logic to control a supply of a calibration gas to the mass spectrometer during the void time of the gas chromatograph; and lock mass calibration logic to obtain a mass spectrum of the calibration gas using the mass spectrometer during the void time of the gas chromatograph and to calculate the mass calibration or the lock mass correction to be used by the sample analysis logic.

In various embodiments of the first aspect, the sample analysis logic, the calibration gas logic, and the lock mass calibration logic can be implemented by a common computing device.

In various embodiments of the first aspect, at least one of the sample analysis logic, the calibration gas logic, and the lock mass calibration logic can be implemented by a computing device remote from the scientific instrument.

In various embodiments of the first aspect, at least one of the sample analysis logic, the calibration gas logic, and the lock mass calibration logic can be implemented by a user computing device.

In various embodiments of the first aspect, at least one of the sample analysis logic, the calibration gas logic, and the lock mass calibration logic can be implemented in the scientific instrument.

In various embodiments of the first aspect, the mass-to-charge ratio used for the lock mass can be determined by receiving input from a user.

In various embodiments of the first aspect, the void time can be determined based on input from a user.

In various embodiments of the first aspect, the void time can be determined based on prior analysis performed using the column.

In various embodiments of the first aspect, the void time can be determined based on a column type and a flow rate.

In various embodiments of the first aspect, the lock mass calibration logic can further include logic to turn on a filament, a high voltage DC device, a high voltage RF device, or any combination thereof during the void time to obtain the mass spectrum of the calibration gas and to turn off the filament, the high voltage DC device, the high voltage RF device, or the combination thereof prior to the solvent peak. In particular embodiments, the sample analysis logic can further include logic to turn on the filament, the high voltage DC device, the high voltage RF device, or the combination thereof after the solvent peak and prior to obtaining the mass spectrum of the sample.

In various embodiments of the first aspect, the mass spectrum of the calibration gas can be excluded from the data recorded for the sample.

In a second aspect, a method for scientific instrument support can include injecting a sample into a gas chromatograph; supplying a calibration gas to a mass spectrometer coupled to the output of the gas chromatograph during the void time of the gas chromatograph; using the mass spectrometer to obtain a mass spectrum of the calibration gas during the void time of the mass; discontinuing the supply of the calibration gas prior to the solvent peak of the sample reaching the output of the gas chromatograph; determining a mass calibration or a lock mass correction based on the mass spectrum of the calibration gas; and using the mass spectrometer to collect a mass spectrum of the sample using the mass calibration or the lock mass correction.

In various embodiments, the second aspect can further include receiving an input from a user to determine the lock mass.

In various embodiments, the second aspect can further include determining the void time based on input from a user.

In various embodiments, the second aspect can further include determining the void time based on prior analysis performed using the column.

In various embodiments, the second aspect can further include determining the void time based on a column type and a flow rate.

In various embodiments, the second aspect can further include turning on a filament of an ion source, a high voltage DC device, a high voltage RF device, or any combination thereof on during the void time to obtain the mass spectrum of the calibration gas and to turning off the filament, the high voltage DC device, the high voltage RF device, or the combination thereof off prior to the solvent peak. Particular embodiments can further include turning on the filament, the high voltage DC device, the high voltage RF device, or the combination thereof on after the solvent peak and prior to obtaining the mass spectrum of the sample.

In various embodiments, one or more non-transitory computer readable media can have instructions thereon that, when executed by one or more processing devices of a scientific instrument support apparatus, cause the scientific instrument support apparatus to perform the method of the second aspect.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIG. 7 is a flow diagram of an example method of maintaining mass calibration, in accordance with various embodiments.

DETAILED DESCRIPTION

Figure 1A:
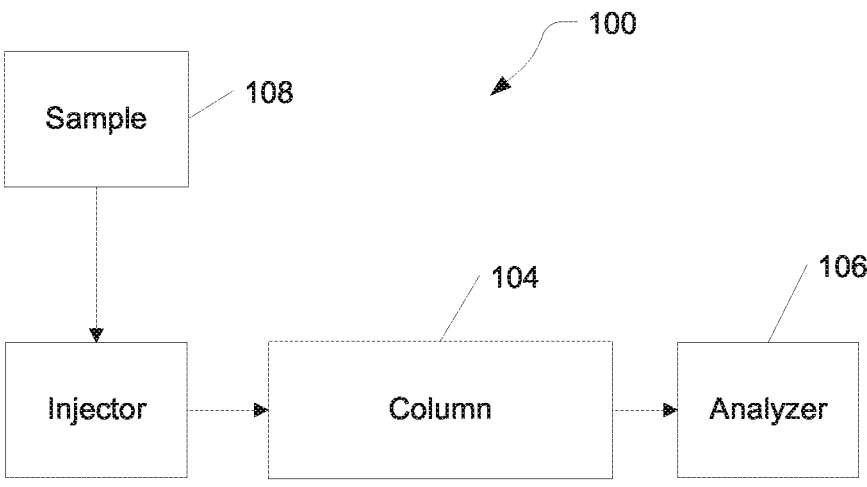
FIG. 1A is a block diagram of an exemplary chromatography system, in accordance with various embodiments.

Disclosed herein are scientific instrument support systems, as well as related methods, computing devices, and computer-readable media. For example, in some embodiments, a scientific instrument support apparatus includes sample analysis logic to cause a sample to be injected into a gas chromatograph and to obtain a mass spectrum of the sample using a mass spectrometer coupled to the output of the gas chromatograph, the mass spectrometer utilizing a mass calibration or a lock mass correction while obtaining the mass spectrum of the sample; calibration gas logic to control a supply of a calibration gas to the mass spectrometer during the void time of the gas chromatograph; and lock mass calibration logic to obtain a mass spectrum of the calibration gas using the mass spectrometer during the void time of the gas chromatograph and to calculate the mass calibration or the lock mass correction to be used by the sample analysis logic.

The scientific instrument support embodiments disclosed herein may achieve improved performance relative to conventional approaches. For example, determining the lock mass as close in time to collecting data for analysis can improve the mass calibration and mass accuracy of the resulting data. Additionally, it is desirable to avoid effecting the acquisition of the analyte, such as by adding the calibrant during data acquisition for the analyte. The embodiments disclosed herein thus provide improvements to scientific instrument technology.

The embodiments disclosed herein may achieve better data quality relative to conventional approaches. For example, conventional approaches may supply the calibrant alongside the analyte. However, these approaches suffer from a number of technical problems and limitations, including the level of calibrant being inadequate due to spectral dynamic range as the analyte or matrix may dominate the mass spectra. Additionally, conventional approaches may violate the purity of the data due to the incorporation of calibrant peaks into the mass spectra.

Various ones of the embodiments disclosed herein may improve upon conventional approaches to achieve the technical advantages of improving data quality and mass accuracy by determining the mass calibration or lock mass correction during the void time of the column, after the sample injection but prior to the solvent peak. A mass calibration is a persistent correction to the reported masses in the analytical sample based upon measurement of mass differences measured for known calibrant ions A lock mass correction is a temporary correction to the reported masses in the analytical sample based upon measurement of mass differences measured for known calibrant ions. Traditionally, a mass calibration will be performed periodically, such as daily, and is applied to all sample analyses performed after the mass calibration until a next mass calibration is performed. Additionally, a lock mass correction can be applied to an individual sample analysis to account for short term deviations caused by various factors, such as temperature variations. Such technical advantages are not achievable by routine and conventional approaches, and all users of systems including such embodiments may benefit from these advantages (e.g., by assisting the user in the performance of a technical task, such as configuring the system to perform the lock mass calibration during the void volume, by means of a guided human-machine interaction process). The technical features of the embodiments disclosed herein are thus decidedly unconventional in the field of gas chromatography-mass spectrometry, as are the combinations of the features of the embodiments disclosed herein. The computational and user interface features disclosed herein do not only involve the collection and comparison of information, but apply new analytical and technical techniques to change the operation of a mass spectrometer. The present disclosure thus introduces functionality that neither a conventional computing device, nor a human, could perform.

Accordingly, the embodiments of the present disclosure may serve any of a number of technical purposes, such as controlling a specific technical system or process; and determining from measurements how to control a machine. In particular, the present disclosure provides technical solutions to technical problems, including but not limited to improving the mass accuracy and data quality for sample analysis by gas chromatography-mass spectrometry.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the subject matter disclosed herein. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrases "A and/or B" and "A or B" mean (A), (B), or (A and B). For the purposes of the present disclosure, the phrases "A, B, and/or C" and "A, B, or C" mean (A), (B), (C), (A and B), (A and C), (B and C), or (A, B, and C). Although some elements may be referred to in the singular (e.g., "a processing device"), any appropriate elements may be represented by multiple instances of that element, and vice versa. For example, a set of operations described as performed by a processing device may be implemented with different ones of the operations performed by different processing devices. As used herein, the phrase "based on" should be understood to mean "based at least in part on," unless otherwise specified.

The description uses the phrases "an embodiment," "various embodiments," and "some embodiments," each of which may refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y. As used herein, an "apparatus" may refer to any individual device, collection of devices, part of a device, or collections of parts of devices. The drawings are not necessarily to scale.

FIG. 1A illustrates a typical gas chromatograph system 100. The system includes an injector 102, a column 104, and a detector 106. A sample 108 can be supplied to the injector 102. In various embodiments, the sample 108 can be a gaseous sample, such as for head space analysis. In other embodiments, the sample 108 can be a liquid sample and the injector can vaporize the liquid sample into a gaseous state. The sample can be moved from the injector to the column 104 by a carrier gas. The column 104 includes a retention medium, typically as a thin coating on the interior surface of the column 104. The retention medium can differentially retain some compounds from the vaporized sample such that the amount of time necessary to transit the column is compound dependent. In this way, the compounds in the vaporized sample can be separated based on the time to transit the column (retention time).

Upon exiting the column 104, the compounds can enter the detector 106. Various detectors can be used as part of a GC system including flame ionization detectors, nitrogen phosphorous detectors, electron capture detectors, thermal conductivity detectors, flame photometric detectors, mass spectrometers, and the like.

Figure 1B:
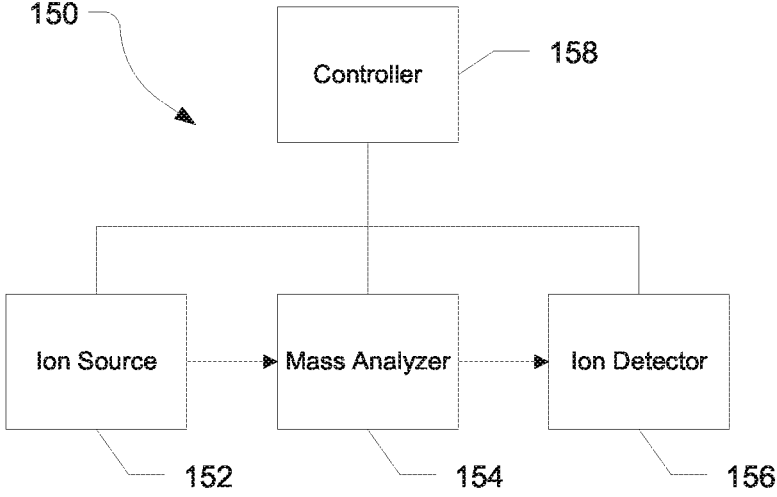
FIG. 1B is a block diagram of an exemplary mass spectrometry system, in accordance with various embodiments.

In various embodiments, elements of FIG. 1B can be incorporated into mass spectrometry platform 150 and incorporated into gas chromatograph system 100 as analyzer 106. According to various embodiments, mass spectrometer 150 can include an ion source 152, a mass analyzer 154, an ion detector 156, and a controller 158.

In various embodiments, the ion source 152 generates a plurality of ions from a sample. The ion source can include, but is not limited to, a matrix assisted laser desorption/ionization (MALDI) source, electrospray ionization (ESI) source, atmospheric pressure chemical ionization (APCI) source, atmospheric pressure photoionization source (APPI), inductively coupled plasma (ICP) source, electron ionization source, chemical ionization source, photoionization source, glow discharge ionization source, thermospray ionization source, and the like.

In various embodiments, the mass analyzer 154 can separate ions based on a mass to charge ratio of the ions. For example, the mass analyzer 154 can include a quadrupole mass filter analyzer, a quadrupole ion trap analyzer, a time-of-flight (TOF) analyzer, an electrostatic trap (e.g., ORBITRAP) mass analyzer, Fourier transform ion cyclotron resonance (FT-ICR) mass analyzer, and the like. In various embodiments, the mass analyzer 154 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio.

In various embodiments, the ion detector 156 can detect ions. For example, the ion detector 156 can include an electron multiplier, a Faraday cup, and the like. Ions leaving the mass analyzer can be detected by the ion detector. In various embodiments, the ion detector can be quantitative, such that an accurate count of the ions can be determined. In various embodiments, such as for an electrostatic trap (e.g. ORBITRAP) mass analyzer, the mass analyzer 154 and the ion detector 156 can be combined into a single device.

In various embodiments, the controller 158 can communicate with the ion source 152, the mass analyzer 154, and the ion detector 156. For example, the controller 158 can configure the ion source or enable/disable the ion source. Additionally, the controller 158 can configure the mass analyzer 154 to select a particular mass range to detect. Further, the controller 158 can adjust the sensitivity of the ion detector 156, such as by adjusting the gain. Additionally, the controller 158 can adjust the polarity of the ion detector 156 based on the polarity of the ions being detected. For example, the ion detector 156 can be configured to detect positive ions or be configured to detected negative ions.

Figure 2:
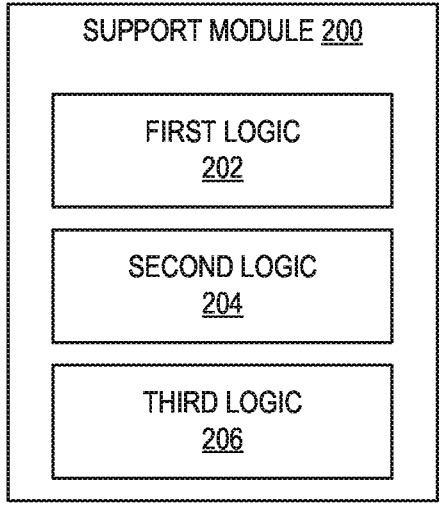
FIG. 2 is a block diagram of an example scientific instrument support module for performing support operations, in accordance with various embodiments.

FIG. 2 is a block diagram of a scientific instrument support module 200 for performing support operations, in accordance with various embodiments. The scientific instrument support module 200 may be implemented by circuitry (e.g., including electrical and/or optical components), such as a programmed computing device. The logic of the scientific instrument support module 200 may be included in a single computing device, or may be distributed across multiple computing devices that are in communication with each other as appropriate. Examples of computing devices that may, singly or in combination, implement the scientific instrument support module 200 are discussed herein with reference to the computing device 500 of FIG. 5, and examples of systems of interconnected computing devices, in which the scientific instrument support module 200 may be implemented across one or more of the computing devices, is discussed herein with reference to the scientific instrument support system 600 of FIG. 6.

The scientific instrument support module 200 may include first logic 202, second logic 204, and third logic 206. As used herein, the term "logic" may include an apparatus that is to perform a set of operations associated with the logic. For example, any of the logic elements included in the support module 200 may be implemented by one or more computing devices programmed with instructions to cause one or more processing devices of the computing devices to perform the associated set of operations. In a particular embodiment, a logic element may include one or more non-transitory computer-readable media having instructions thereon that, when executed by one or more processing devices of one or more computing devices, cause the one or more computing devices to perform the associated set of operations. As used herein, the term "module" may refer to a collection of one or more logic elements that, together, perform a function associated with the module. Different ones of the logic elements in a module may take the same form or may take different forms. For example, some logic in a module may be implemented by a programmed general-purpose processing device, while other logic in a module may be implemented by an application-specific integrated circuit (ASIC). In another example, different ones of the logic elements in a module may be associated with different sets of instructions executed by one or more processing devices. A module may not include all of the logic elements depicted in the associated drawing; for example, a module may include a subset of the logic elements depicted in the associated drawing when that module is to perform a subset of the operations discussed herein with reference to that module.

The first logic 202 may perform a sample analysis. The first logic 202 may include instructions to cause a sample to be injected into a gas chromatograph. The output of the chromatograph can be directed to a mass spectrometer and the first logic 202 may include instructions to collect one or more mass spectra of the sample components as they exit the gas chromatograph. The first logic 202 may utilize a mass calibration and/or a lock mass correction while collecting the one or more mass spectra of the sample components. In various embodiments, the first logic may turn on the filament or other components after the solvent peak and prior to obtaining the mass spectrum of the sample. Other components of the mass spectrometer, such as high voltage DC or RF devices, may be turned off during the solvent peak to prevent damage to the mass spectrometer components, such as by arcing or forming a plasma.

The second logic 204 may control the flow of calibration gas to the mass spectrometer. The second logic 204 can supply the calibration gas to the mass spectrometer during the void time of the gas chromatograph. Additionally, the second logic can discontinue the supply of calibration gas to the mass spectrometer prior to the solvent peak reaching mass spectrometer. For example, the second logic 204 can start the supply of calibration gas, such as by triggering a valve to open, during injection of the sample into the gas chromatograph or shortly thereafter and stop the supply, such as by triggering the valve to close, prior to the solvent peak reaching the mass spectrometer. In various embodiments, the void time can be determined based on input from a user, prior analysis performed using the column, a column type, a flow rate, or any combination thereof.

The third logic 206 may determine a mass calibration or a lock mass correction. The third logic 206 may obtain one or more mass spectra of the calibration gas during the time in which the second logic 204 is supplying calibration gas to the mass spectrometer. The third logic 206 may also determine the mass calibration or the lock mass correction based on the one or more mass spectrum of the calibration gas. The third logic 206 can provide the mass calibration or the lock mass correction to the first logic 202 to be used when collecting the mass spectrum of the sample. In various embodiments, the mass-to-charge ratio used for the lock mass can be determined by receiving input from a user. In various embodiments, the third logic may turn on a filament of an ion source or other components of the mass spectrometer during the void time to obtain the mass spectrum of the calibration gas and to turn off the filament or other components prior to the solvent peak.

In various embodiments, it may be desirable to store the mass spectrum of the calibration gas along with the data recorded for the sample. In other embodiments, the mass spectrum of the calibration gas may not be stored or may be stored separately from the data recorded for the sample.

Figure 3:
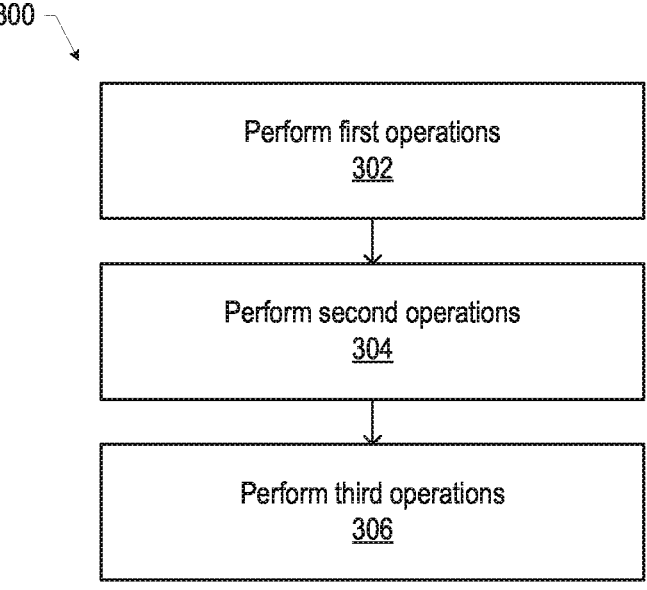
FIG. 3 is a flow diagram of an example method of maintain mass calibration, in accordance with various embodiments.

FIG. 3 is a flow diagram of a method 300 of performing support operations, in accordance with various embodiments. Although the operations of the method 300 may be illustrated with reference to particular embodiments disclosed herein (e.g., the scientific instrument support modules 200 discussed herein with reference to FIG. 2, the GUI 400 discussed herein with reference to FIG. 4, the computing devices 500 discussed herein with reference to FIG. 5, and/or the scientific instrument support system 600 discussed herein with reference to FIG. 6), the method 300 may be used in any suitable setting to perform any suitable support operations. Operations are illustrated once each and in a particular order in FIG. 3, but the operations may be reordered and/or repeated as desired and appropriate (e.g., different operations performed may be performed in parallel, as suitable).

At 302, first operations may be performed. For example, the first logic 202 of a support module 200 may perform the operations of 302. The first operations may include injecting a sample into a gas chromatograph and collecting one or more a mass spectra of the sample components as they exit the gas chromatograph. A mass calibration and/or a lock mass correction can be used while collecting the one or more a mass spectra of the sample components. In various embodiments, the first operations may include turning the filament and other components on after the solvent peak and prior to obtaining the mass spectrum of the sample. Other components of the mass spectrometer, such as high voltage DC or RF devices, may be turned off during the solvent peak to prevent damage to the mass spectrometer components, such as by forming an arc of plasma.

At 304, second operations may be performed. For example, the second logic 204 of a support module 200 may perform the operations of 304. The second operations may include controlling the flow of calibration gas to the mass spectrometer. The second operations can include suppling the calibration gas to the mass spectrometer during the void time of the gas chromatograph. Additionally, the second operations can include discontinuing the supply of calibration gas to the mass spectrometer prior to the solvent peak reaching mass spectrometer. In various embodiments, the void time can be determined based on input from a user, prior analysis performed using the column, a column type, a flow rate, or any combination thereof.

At 306, third operations may be performed. For example, the third logic 206 of a support module 200 may perform the operations of 306. The third operations may include determining a mass calibration or lock mass correction. The third operations may include obtaining one or more mass spectra of the calibration gas during the void time while the calibration gas is supplied to the mass spectrometer. The third operations also include determining the mass calibration or lock mass correction based on the one or more mass spectra of the calibration gas. In various embodiments, the mass-to-charge ratios used for the mass calibration or the lock mass correction can be determined by receiving input from a user. In various embodiments, the third operations may turn on a filament of an ion source or other components of the mass spectrometer during the void time to obtain the mass spectrum of the calibration gas and turn off the filament or other components prior to the solvent peak.

Figure 5:
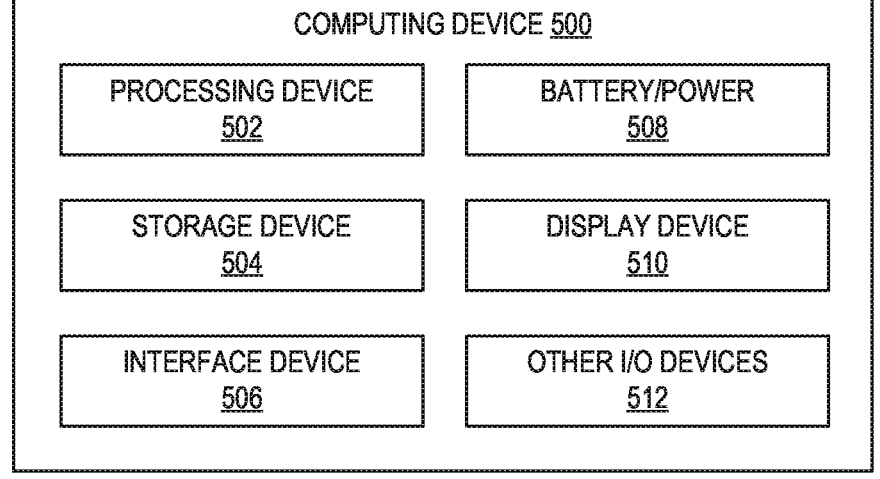
FIG. 5 is a block diagram of an example computing device that may perform some or all of the scientific instrument support methods disclosed herein, in accordance with various embodiments.
Figure 6:
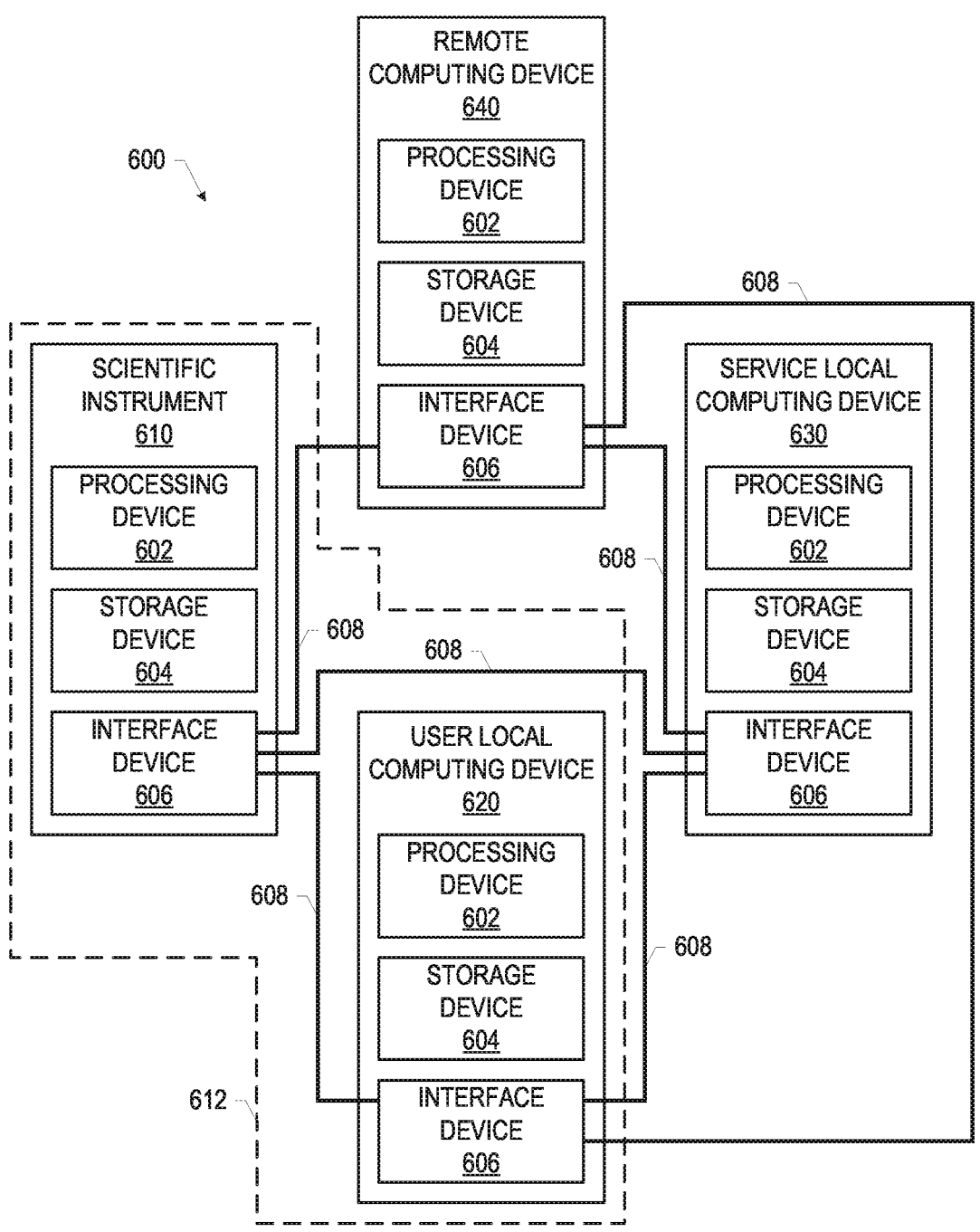
FIG. 6 is a block diagram of an example scientific instrument support system in which some or all of the scientific instrument support methods disclosed herein may be performed, in accordance with various embodiments.

The scientific instrument support methods disclosed herein may include interactions with a human user (e.g., via the user local computing device 620 discussed herein with reference to FIG. 6). These interactions may include providing information to the user (e.g., information regarding the operation of a scientific instrument such as the scientific instrument 610 of FIG. 6, information regarding a sample being analyzed or other test or measurement performed by a scientific instrument, information retrieved from a local or remote database, or other information) or providing an option for a user to input commands (e.g., to control the operation of a scientific instrument such as the scientific instrument 610 of FIG. 6, or to control the analysis of data generated by a scientific instrument), queries (e.g., to a local or remote database), or other information. In some embodiments, these interactions may be performed through a graphical user interface (GUI) that includes a visual display on a display device (e.g., the display device 510 discussed herein with reference to FIG. 5) that provides outputs to the user and/or prompts the user to provide inputs (e.g., via one or more input devices, such as a keyboard, mouse, trackpad, or touchscreen, included in the other I/O devices 512 discussed herein with reference to FIG. 5). The scientific instrument support systems disclosed herein may include any suitable GUIs for interaction with a user.

Figure 4:
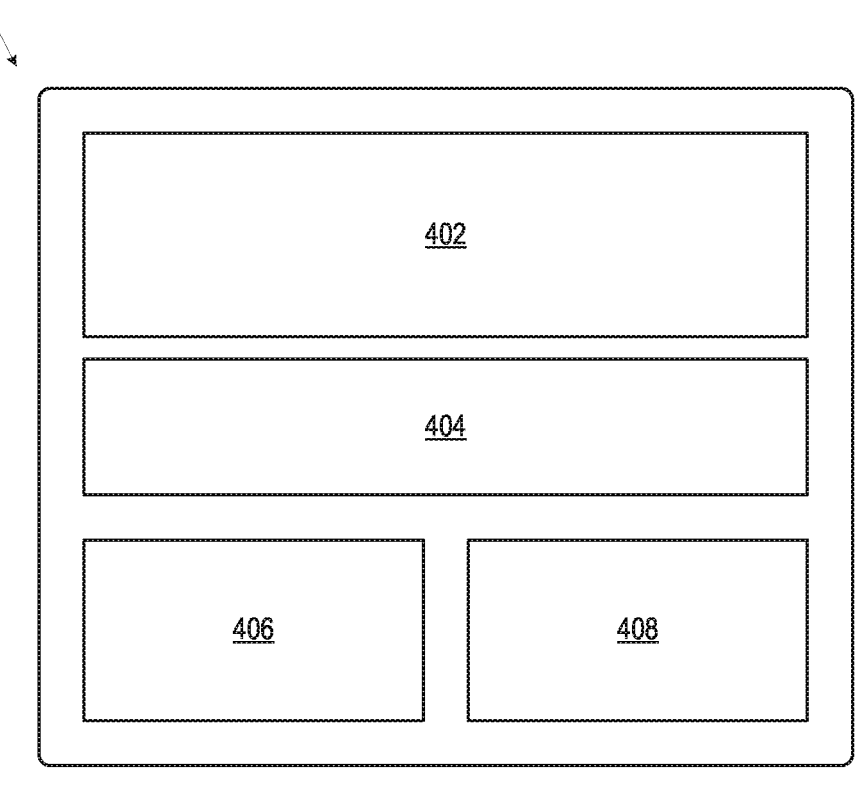
FIG. 4 is an example of a graphical user interface that may be used in the performance of some or all of the support methods disclosed herein, in accordance with various embodiments.

FIG. 4 depicts an example GUI 400 that may be used in the performance of some or all of the support methods disclosed herein, in accordance with various embodiments. As noted above, the GUI 400 may be provided on a display device (e.g., the display device 510 discussed herein with reference to FIG. 5) of a computing device (e.g., the computing device 500 discussed herein with reference to FIG. 5) of a scientific instrument support system (e.g., the scientific instrument support system 600 discussed herein with reference to FIG. 6), and a user may interact with the GUI 400 using any suitable input device (e.g., any of the input devices included in the other I/O devices 512 discussed herein with reference to FIG. 5) and input technique (e.g., movement of a cursor, motion capture, facial recognition, gesture detection, voice recognition, actuation of buttons, etc.).

The GUI 400 may include a data display region 402, a data analysis region 404, a scientific instrument control region 406, and a settings region 408. The particular number and arrangement of regions depicted in FIG. 4 is simply illustrative, and any number and arrangement of regions, including any desired features, may be included in a GUI 400.

The data display region 402 may display data generated by a scientific instrument (e.g., the scientific instrument 610 discussed herein with reference to FIG. 6). For example, the data display region 402 may display a mass spectrum.

The data analysis region 404 may display the results of data analysis (e.g., the results of analyzing the data illustrated in the data display region 402 and/or other data). For example, the data analysis region 404 may display retention time, mass to charge ratio, and intensities for various peaks identified in the mass spectra. In some cases, the identity of the compounds giving rise to the peaks can be displayed. In some embodiments, the data display region 402 and the data analysis region 404 may be combined in the GUI 400 (e.g., to include data output from a scientific instrument, and some analysis of the data, in a common graph or region).

The scientific instrument control region 406 may include options that allow the user to control a scientific instrument (e.g., the scientific instrument 610 discussed herein with reference to FIG. 6). For example, the scientific instrument control region 406 may include options for enabling the determination of the mass calibration or the lock mass correction during the void time. In various embodiments, this can include a plurality of settings for providing the m/z ratios of the ions to be used to determine the mass calibration or the lock mass correction, providing the void time, controlling when the filament and other components are on, and the scan parameters for the mass spectrum to be collected of the calibration gas. In other embodiments, the scientific instrument control region 406 can include simplified controls that automatically enable determination of the mass calibration or lock mass correction during the void time, such as a switch or checkbox.

The settings region 408 may include options that allow the user to control the features and functions of the GUI 400 (and/or other GUIs) and/or perform common computing operations with respect to the data display region 402 and data analysis region 404 (e.g., saving data on a storage device, such as the storage device 504 discussed herein with reference to FIG. 5, sending data to another user, labeling data, etc.).

As noted above, the scientific instrument support module 200 may be implemented by one or more computing devices. FIG. 5 is a block diagram of a computing device 500 that may perform some or all of the scientific instrument support methods disclosed herein, in accordance with various embodiments. In some embodiments, the scientific instrument support module 200 may be implemented by a single computing device 500 or by multiple computing devices 500. Further, as discussed below, a computing device 500 (or multiple computing devices 500) that implements the scientific instrument support module 200 may be part of one or more of the scientific instrument 610, the user local computing device 620, the service local computing device 630, or the remote computing device 640 of FIG. 6.

The computing device 500 of FIG. 5 is illustrated as having a number of components, but any one or more of these components may be omitted or duplicated, as suitable for the application and setting. In some embodiments, some or all of the components included in the computing device 500 may be attached to one or more motherboards and enclosed in a housing (e.g., including plastic, metal, and/or other materials). In some embodiments, some these components may be fabricated onto a single system-on-a-chip (SoC) (e.g., an SoC may include one or more processing devices 502 and one or more storage devices 504). Additionally, in various embodiments, the computing device 500 may not include one or more of the components illustrated in FIG. 5, but may include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 500 may not include a display device 510, but may include display device interface circuitry (e.g., a connector and driver circuitry) to which a display device 510 may be coupled.

The computing device 500 may include a processing device 502 (e.g., one or more processing devices). As used herein, the term "processing device" may refer to any device or portion of a device that processes electronic data from registers and/or memory to transform that electronic data into other electronic data that may be stored in registers and/or memory. The processing device 502 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 500 may include a storage device 504 (e.g., one or more storage devices). The storage device 504 may include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In some embodiments, the storage device 504 may include memory that shares a die with a processing device 502. In such an embodiment, the memory may be used as cache memory and may include embedded dynamic random access memory (eDRAM) or spin transfer torque magnetic random access memory (STT-MRAM), for example. In some embodiments, the storage device 504 may include non-transitory computer readable media having instructions thereon that, when executed by one or more processing devices (e.g., the processing device 502), cause the computing device 500 to perform any appropriate ones of or portions of the methods disclosed herein.

The computing device 500 may include an interface device 506 (e.g., one or more interface devices 506). The interface device 506 may include one or more communication chips, connectors, and/or other hardware and software to govern communications between the computing device 500 and other computing devices. For example, the interface device 506 may include circuitry for managing wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. Circuitry included in the interface device 506 for managing wireless communications may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In some embodiments, circuitry included in the interface device 506 for managing wireless communications may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In some embodiments, circuitry included in the interface device 506 for managing wireless communications may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In some embodiments, circuitry included in the interface device 506 for managing wireless communications may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In some embodiments, the interface device 506 may include one or more antennas (e.g., one or more antenna arrays) to receipt and/or transmission of wireless communications.

In some embodiments, the interface device 506 may include circuitry for managing wired communications, such as electrical, optical, or any other suitable communication protocols. For example, the interface device 506 may include circuitry to support communications in accordance with Ethernet technologies. In some embodiments, the interface device 506 may support both wireless and wired communication, and/or may support multiple wired communication protocols and/or multiple wireless communication protocols. For example, a first set of circuitry of the interface device 506 may be dedicated to shorter-range wireless communications such as Wi-Fi or Bluetooth, and a second set of circuitry of the interface device 506 may be dedicated to longer-range wireless communications such as global positioning system (GPS), EDGE, GPRS, CDMA, WiMAX, LTE, EV-DO, or others. In some embodiments, a first set of circuitry of the interface device 506 may be dedicated to wireless communications, and a second set of circuitry of the interface device 506 may be dedicated to wired communications.

The computing device 500 may include battery/power circuitry 508. The battery/power circuitry 508 may include one or more energy storage devices (e.g., batteries or capacitors) and/or circuitry for coupling components of the computing device 500 to an energy source separate from the computing device 500 (e.g., AC line power).

The computing device 500 may include a display device 510 (e.g., multiple display devices). The display device 510 may include any visual indicators, such as a heads-up display, a computer monitor, a projector, a touchscreen display, a liquid crystal display (LCD), a light-emitting diode display, or a flat panel display.

The computing device 500 may include other input/output (I/O) devices 512. The other I/O devices 512 may include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 500, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 500 may have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

One or more computing devices implementing any of the scientific instrument support modules or methods disclosed herein may be part of a scientific instrument support system. FIG. 6 is a block diagram of an example scientific instrument support system 600 in which some or all of the scientific instrument support methods disclosed herein may be performed, in accordance with various embodiments. The scientific instrument support modules and methods disclosed herein (e.g., the scientific instrument support module 200 of FIG. 2 and the method 300 of FIG. 3) may be implemented by one or more of the scientific instrument 610, the user local computing device 620, the service local computing device 630, or the remote computing device 640 of the scientific instrument support system 600.

Any of the scientific instrument 610, the user local computing device 620, the service local computing device

630, or the remote computing device 640 may include any of the embodiments of the computing device 500 discussed herein with reference to FIG. 5, and any of the scientific instrument 610, the user local computing device 620, the service local computing device 630, or the remote computing device 640 may take the form of any appropriate ones of the embodiments of the computing device 500 discussed herein with reference to FIG. 5.

The scientific instrument 610, the user local computing device 620, the service local computing device 630, or the remote computing device 640 may each include a processing device 602, a storage device 604, and an interface device 606. The processing device 602 may take any suitable form, including the form of any of the processing devices 502 discussed herein with reference to FIG. 5, and the processing devices 602 included in different ones of the scientific instrument 610, the user local computing device 620, the service local computing device 630, or the remote computing device 640 may take the same form or different forms. The storage device 604 may take any suitable form, including the form of any of the storage devices 504 discussed herein with reference to FIG. 5, and the storage devices 604 included in different ones of the scientific instrument 610, the user local computing device 620, the service local computing device 630, or the remote computing device 640 may take the same form or different forms. The interface device 606 may take any suitable form, including the form of any of the interface devices 506 discussed herein with reference to FIG. 5, and the interface devices 606 included in different ones of the scientific instrument 610, the user local computing device 620, the service local computing device 630, or the remote computing device 640 may take the same form or different forms.

The scientific instrument 610, the user local computing device 620, the service local computing device 630, and the remote computing device 640 may be in communication with other elements of the scientific instrument support system 600 via communication pathways 608. The communication pathways 608 may communicatively couple the interface devices 606 of different ones of the elements of the scientific instrument support system 600, as shown, and may be wired or wireless communication pathways (e.g., in accordance with any of the communication techniques discussed herein with reference to the interface devices 506 of the computing device 500 of FIG. 5). The particular scientific instrument support system 600 depicted in FIG. 6 includes communication pathways between each pair of the scientific instrument 610, the user local computing device 620, the service local computing device 630, and the remote computing device 640, but this "fully connected" implementation is simply illustrative, and in various embodiments, various ones of the communication pathways 608 may be absent. For example, in some embodiments, a service local computing device 630 may not have a direct communication pathway 608 between its interface device 606 and the interface device 606 of the scientific instrument 610, but may instead communicate with the scientific instrument 610 via the communication pathway 608 between the service local computing device 630 and the user local computing device 620 and the communication pathway 608 between the user local computing device 620 and the scientific instrument 610.

The scientific instrument 610 may include any appropriate scientific instrument, such as a gas chromatograph-mass spectrometer.

The user local computing device 620 may be a computing device (e.g., in accordance with any of the embodiments of the computing device 500 discussed herein) that is local to a user of the scientific instrument 610. In some embodiments, the user local computing device 620 may also be local to the scientific instrument 610, but this need not be the case; for example, a user local computing device 620 that is in a user's home or office may be remote from, but in communication with, the scientific instrument 610 so that the user may use the user local computing device 620 to control and/or access data from the scientific instrument 610. In some embodiments, the user local computing device 620 may be a laptop, smartphone, or tablet device. In some embodiments the user local computing device 620 may be a portable computing device.

The service local computing device 630 may be a computing device (e.g., in accordance with any of the embodiments of the computing device 500 discussed herein) that is local to an entity that services the scientific instrument 610. For example, the service local computing device 630 may be local to a manufacturer of the scientific instrument 610 or to a third-party service company. In some embodiments, the service local computing device 630 may communicate with the scientific instrument 610, the user local computing device 620, and/or the remote computing device 640 (e.g., via a direct communication pathway 608 or via multiple "indirect" communication pathways 608, as discussed above) to receive data regarding the operation of the scientific instrument 610, the user local computing device 620, and/or the remote computing device 640 (e.g., the results of self-tests of the scientific instrument 610, calibration coefficients used by the scientific instrument 610, the measurements of sensors associated with the scientific instrument 610, etc.). In some embodiments, the service local computing device 630 may communicate with the scientific instrument 610, the user local computing device 620, and/or the remote computing device 640 (e.g., via a direct communication pathway 608 or via multiple "indirect" communication pathways 608, as discussed above) to transmit data to the scientific instrument 610, the user local computing device 620, and/or the remote computing device 640 (e.g., to update programmed instructions, such as firmware, in the scientific instrument 610, to initiate the performance of test or calibration sequences in the scientific instrument 610, to update programmed instructions, such as software, in the user local computing device 620 or the remote computing device 640, etc.). A user of the scientific instrument 610 may utilize the scientific instrument 610 or the user local computing device 620 to communicate with the service local computing device 630 to report a problem with the scientific instrument 610 or the user local computing device 620, to request a visit from a technician to improve the operation of the scientific instrument 610, to order consumables or replacement parts associated with the scientific instrument 610, or for other purposes.

The remote computing device 640 may be a computing device (e.g., in accordance with any of the embodiments of the computing device 500 discussed herein) that is remote from the scientific instrument 610 and/or from the user local computing device 620. In some embodiments, the remote computing device 640 may be included in a datacenter or other large-scale server environment. In some embodiments, the remote computing device 640 may include network-attached storage (e.g., as part of the storage device 604). The remote computing device 640 may store data generated by the scientific instrument 610, perform analyses of the data generated by the scientific instrument 610 (e.g., in accordance with programmed instructions), facilitate communication between the user local computing device 620 and the scientific instrument 610, and/or facilitate communication between the service local computing device 630 and the scientific instrument 610.

In some embodiments, one or more of the elements of the scientific instrument support system 600 illustrated in FIG. 6 may not be present. Further, in some embodiments, multiple ones of various ones of the elements of the scientific instrument support system 600 of FIG. 6 may be present. For example, a scientific instrument support system 600 may include multiple user local computing devices 620 (e.g., different user local computing devices 620 associated with different users or in different locations). In another example, a scientific instrument support system 600 may include multiple scientific instruments 610, all in communication with service local computing device 630 and/or a remote computing device 640; in such an embodiment, the service local computing device 630 may monitor these multiple scientific instruments 610, and the service local computing device 630 may cause updates or other information may be "broadcast" to multiple scientific instruments 610 at the same time. Different ones of the scientific instruments 610 in a scientific instrument support system 600 may be located close to one another (e.g., in the same room) or farther from one another (e.g., on different floors of a building, in different buildings, in different cities, etc.). In some embodiments, a scientific instrument 610 may be connected to an Internet-of-Things (IoT) stack that allows for command and control of the scientific instrument 610 through a web-based application, a virtual or augmented reality application, a mobile application, and/or a desktop application. Any of these applications may be accessed by a user operating the user local computing device 620 in communication with the scientific instrument 610 by the intervening remote computing device 640. In some embodiments, a scientific instrument 610 may be sold by the manufacturer along with one or more associated user local computing devices 620 as part of a local scientific instrument computing unit 612.

In some embodiments, different ones of the scientific instruments 610 included in a scientific instrument support system 600 may be different types of scientific instruments 610; for example, one scientific instrument 610 may be a gas chromatograph, while another scientific instrument 610 may be a mass spectrometer. In some such embodiments, the remote computing device 640 and/or the user local computing device 620 may combine data from different types of scientific instruments 610 included in a scientific instrument support system 600.

The invention claimed is:

1. A scientific instrument support system, comprising:
sample analysis logic to cause a sample to be injected into a gas chromatograph and to obtain a mass spectrum of the sample using a mass spectrometer coupled to the output of the gas chromatograph, the mass spectrometer utilizing a mass calibration or a lock mass correction while obtaining the mass spectrum of the sample;
calibration gas logic to control a supply of a calibration gas to the mass spectrometer during the void time of the gas chromatograph; and
lock mass calibration logic to obtain a mass spectrum of the calibration gas using the mass spectrometer during the void time of the gas chromatograph, to calculate the mass calibration or the lock mass correction to be used by the sample analysis logic, to turn on a filament of an ion source, a high voltage DC device, a high voltage RF device, or any combination thereof during the void time to obtain the mass spectrum of the calibration gas, and to turn off the filament, the high voltage DC device, the high voltage RF device, or the combination thereof prior to a solvent peak.

2. The scientific instrument support system of claim 1, wherein the sample analysis logic, the calibration gas logic, and the lock mass calibration logic are implemented by a common computing device.

3. The scientific instrument support system of claim 1, wherein at least one of the sample analysis logic, the calibration gas logic, and the lock mass calibration logic are implemented by a computing device remote from the scientific instrument.

4. The scientific instrument support system of claim 1, wherein at least one of the sample analysis logic, the calibration gas logic, and the lock mass calibration logic are implemented by a user computing device.

5. The scientific instrument support system of claim 1, wherein at least one of the sample analysis logic, the calibration gas logic, and the lock mass calibration logic are implemented in the scientific instrument.

6. The scientific instrument support system of claim 1, wherein the mass-to-charge ratio used for the lock mass is determined by receiving input from a user.

7. The scientific instrument support system of claim 1, wherein the void time is determined based on input from a user.

8. The scientific instrument support system of claim 1, wherein the void time is determined based on prior analysis performed using a column of the gas chromatograph.

9. The scientific instrument support system of claim 1, wherein the void time is determined based on a column type and a flow rate.

10. The scientific instrument support system of claim 1, wherein the sample analysis logic further includes logic to turn on the filament, the high voltage DC device, the high voltage RF device, or the combination thereof after the solvent peak and prior to obtaining the mass spectrum of the sample.

11. The scientific instrument support system of claim 1, wherein the mass spectrum of the calibration gas is not included in data recorded for the sample.

12. A method for scientific instrument support, comprising:
injecting a sample into a gas chromatograph;
supplying a calibration gas to a mass spectrometer coupled to the output of the gas chromatograph during a void time of the gas chromatograph;
using the mass spectrometer to obtain a mass spectrum of the calibration gas during the void time of the gas chromatograph;
discontinuing the supply of the calibration gas prior to a solvent peak of the sample reaching the output of the gas chromatograph;
determining a mass calibration or a lock mass correction based on the mass spectrum of the calibration gas; and
using the mass spectrometer to collect a mass spectrum of the sample using the mass calibration or the lock mass correction.

13. The method of claim 12, further comprising receiving an input from a user to determine the lock mass correction.

14. The method of claim 12, further comprising determining the void time based on input from a user.

15. The method of claim 12, further comprising determining the void time based on prior analysis performed using a column of the gas chromatograph.

16. The method of claim 12, further comprising determining the void time based on a column type and a flow rate.

17. The method of claim 12, further comprising turning on a filament of an ion source, a high voltage DC device, a high voltage RF device, or any combination thereof during the void time to obtain the mass spectrum of the calibration gas and to turning off the filament, the high voltage DC device, the high voltage RF device, or the combination thereof prior to the solvent peak.

18. The method of claim 17, further comprising turning on the filament, the high voltage DC device, the high voltage RF device, or the combination thereof after the solvent peak and prior to obtaining the mass spectrum of the sample.

19. One or more non-transitory computer readable media having instructions thereon that, when executed by one or more processing devices of a scientific instrument support apparatus, cause the scientific instrument support apparatus to perform the method of claim 12.

\* \* \* \* \*